(12) United States Patent
Manett et al.

(10) Patent No.: US 10,450,834 B2
(45) Date of Patent: Oct. 22, 2019

(54) BALL VALVE

(71) Applicant: Expro North Sea Limited, Dyce, Aberdeenshire (GB)

(72) Inventors: Kris Manett, Fraserburgh (GB); Paul Deacon, Aberdeen (GB)

(73) Assignee: Expro North Sea Limited, Dyce (GB)

( * ) Notice: Subject to any disclaimer, the term of this patent is extended or adjusted under 35 U.S.C. 154(b) by 0 days.

(21) Appl. No.: 15/543,479

(22) PCT Filed: Dec. 11, 2015

(86) PCT No.: PCT/GB2015/053855
§ 371 (c)(1),
(2) Date: Jul. 13, 2017

(87) PCT Pub. No.: WO2016/113525
PCT Pub. Date: Jul. 21, 2016

(65) Prior Publication Data
US 2017/0370180 A1    Dec. 28, 2017

(30) Foreign Application Priority Data

Jan. 14, 2015 (GB) .................................. 1500554.9

(51) Int. Cl.
| | |
|---|---|
| *E21B 29/08* | (2006.01) |
| *E21B 29/12* | (2006.01) |
| *E21B 33/06* | (2006.01) |
| *E21B 33/064* | (2006.01) |
| *E21B 34/04* | (2006.01) |
| *E21B 34/10* | (2006.01) |

(Continued)

(52) U.S. Cl.
CPC ............ *E21B 34/045* (2013.01); *E21B 29/08* (2013.01); *E21B 29/12* (2013.01); *E21B 33/06* (2013.01); *E21B 33/064* (2013.01); *E21B 34/10* (2013.01); *F16K 5/0605* (2013.01); *F16K 27/067* (2013.01); *E21B 2034/002* (2013.01); *F16K 5/0663* (2013.01)

(58) Field of Classification Search
CPC ...... E21B 29/12; E21B 33/064; E21B 34/045; E21B 2034/002; F16K 5/0605; F16K 27/067
See application file for complete search history.

(56) References Cited

U.S. PATENT DOCUMENTS

| | | | | |
|---|---|---|---|---|
| 3,883,113 A | * | 5/1975 | Kolb ..................... | F16K 5/0605 251/151 |
| 4,009,753 A | * | 3/1977 | McGill ................... | E21B 29/04 166/298 |

(Continued)

*Primary Examiner* — Matthew R Buck
(74) *Attorney, Agent, or Firm* — O'Shea Getz P.C.

(57) ABSTRACT

A ball valve is provided. The ball valve includes a housing, a ball seat arranged in the housing, a ball member mounted within the housing and being rotatable relative to the ball seat between open and closed positions, the ball seat and ball member defining respective through bores, the ball member including a sealing surface, a bore surface and a leading edge surface extending between the sealing surface and the bore surface, the leading edge surface being configured to cut a body extending at least partially through the valve upon closure of the ball member, wherein said leading edge surface is truncated. The ball member may include a relief region proximate the leading edge surface.

15 Claims, 9 Drawing Sheets

(51) Int. Cl.
*F16K 5/06* (2006.01)
*F16K 27/06* (2006.01)
*E21B 34/00* (2006.01)

(56) References Cited

U.S. PATENT DOCUMENTS

| | | | | |
|---|---|---|---|---|
| 4,289,165 A | * | 9/1981 | Fredd | E21B 34/14 137/625.32 |
| 4,429,717 A | | 2/1984 | Montgomery | |
| 4,883,253 A | * | 11/1989 | Hashimoto | F16K 5/0668 251/163 |
| 5,284,209 A | * | 2/1994 | Godfrey | E21B 29/04 166/336 |
| 5,413,310 A | * | 5/1995 | Horvei | E21B 34/04 251/159 |
| 6,152,229 A | * | 11/2000 | Jennings | E21B 29/04 137/613 |
| 8,403,063 B2 | * | 3/2013 | Inglis | E21B 34/14 166/316 |
| 8,662,183 B1 | * | 3/2014 | Vickio, Jr. | E21B 29/08 166/361 |
| 9,657,550 B2 | * | 5/2017 | Inglis | F16K 5/0605 |
| 2010/0051847 A1 | * | 3/2010 | Mailand | E21B 29/04 251/288 |
| 2014/0116717 A1 | * | 5/2014 | Guven | E21B 29/04 166/361 |
| 2014/0174755 A1 | * | 6/2014 | Mitchell | E21B 34/04 166/368 |
| 2014/0209314 A1 | * | 7/2014 | Guven | E21B 33/063 166/336 |

\* cited by examiner

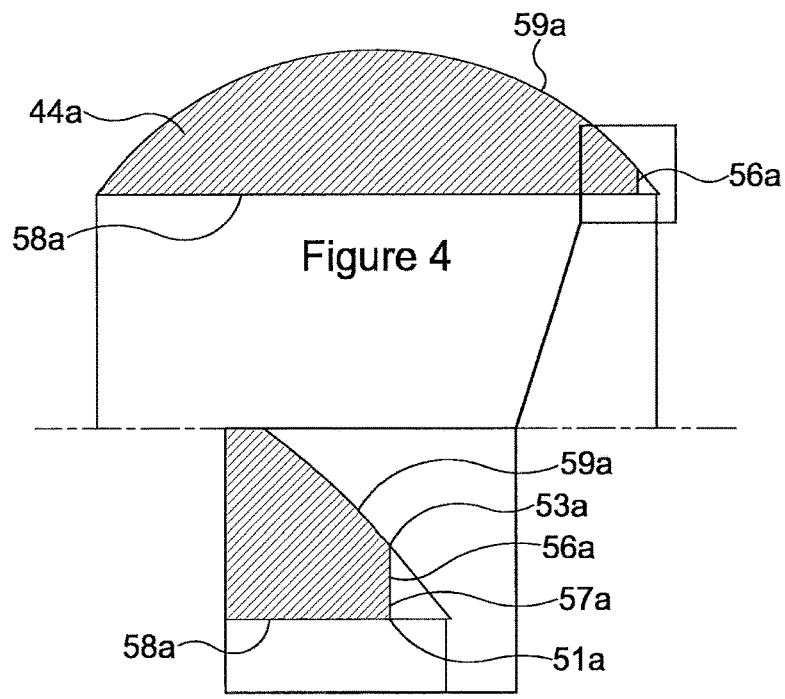
Figure 4
Figure 4A
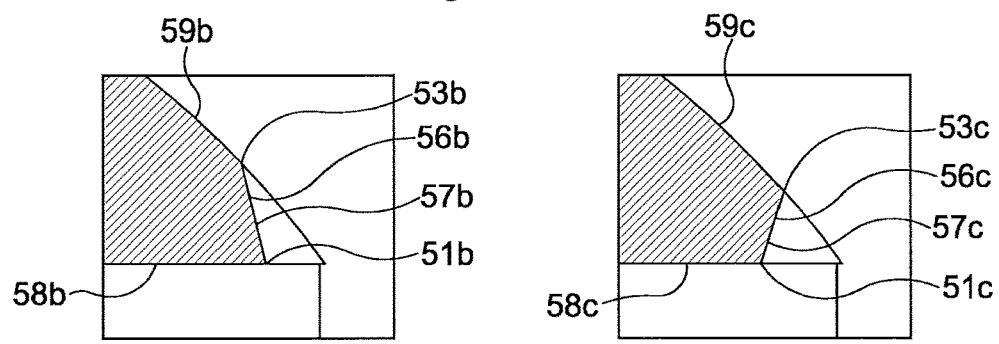
Figure 4B    Figure 4C
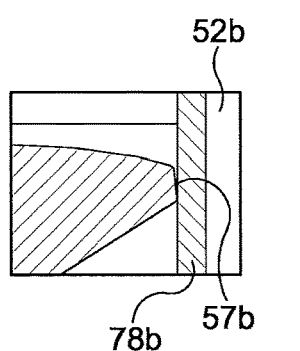
Figure 5
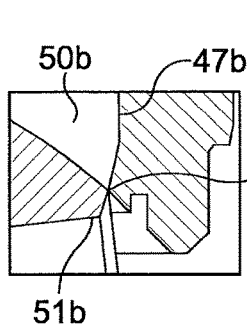
Figure 6
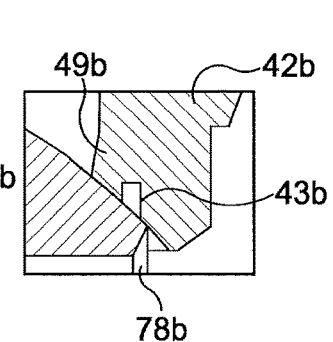
Figure 7

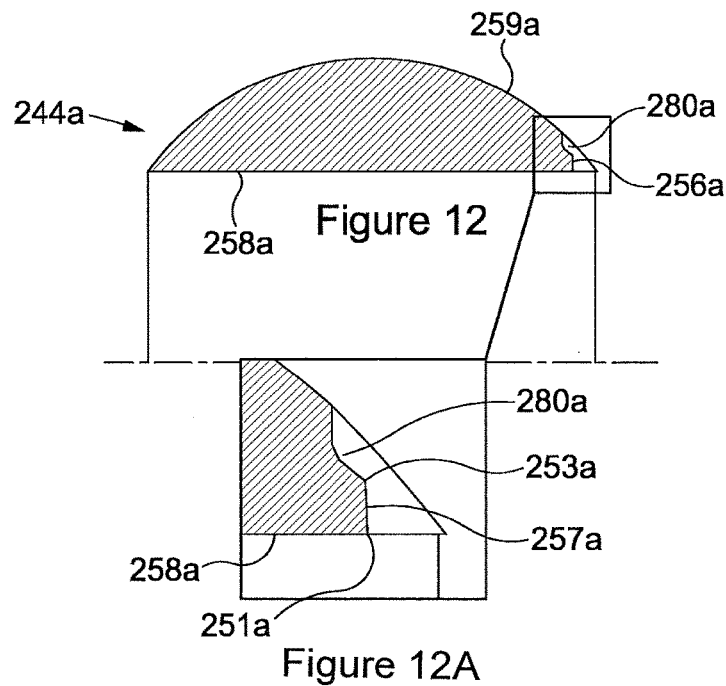
Figure 12
Figure 12A
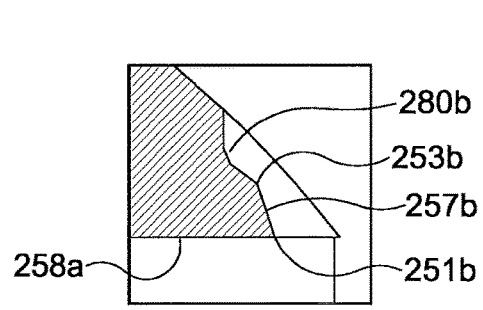
Figure 12B
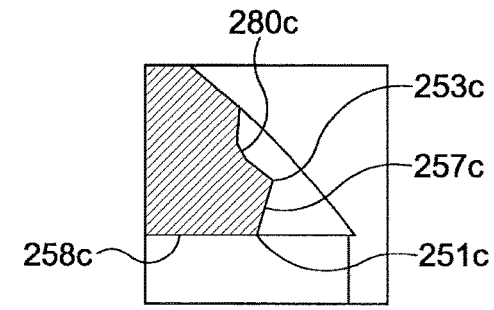
Figure 12C
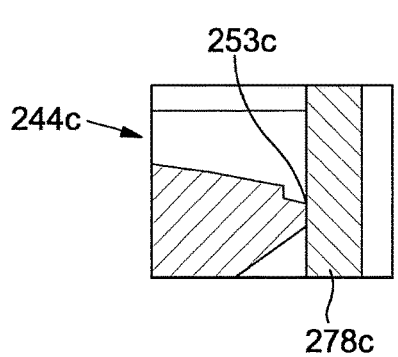
Figure 13
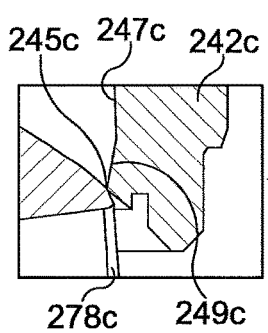
Figure 14
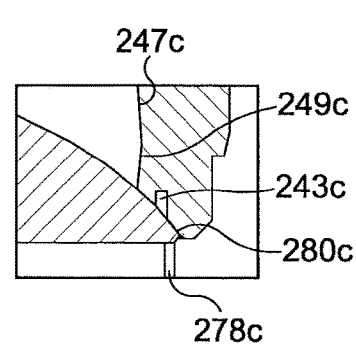
Figure 15

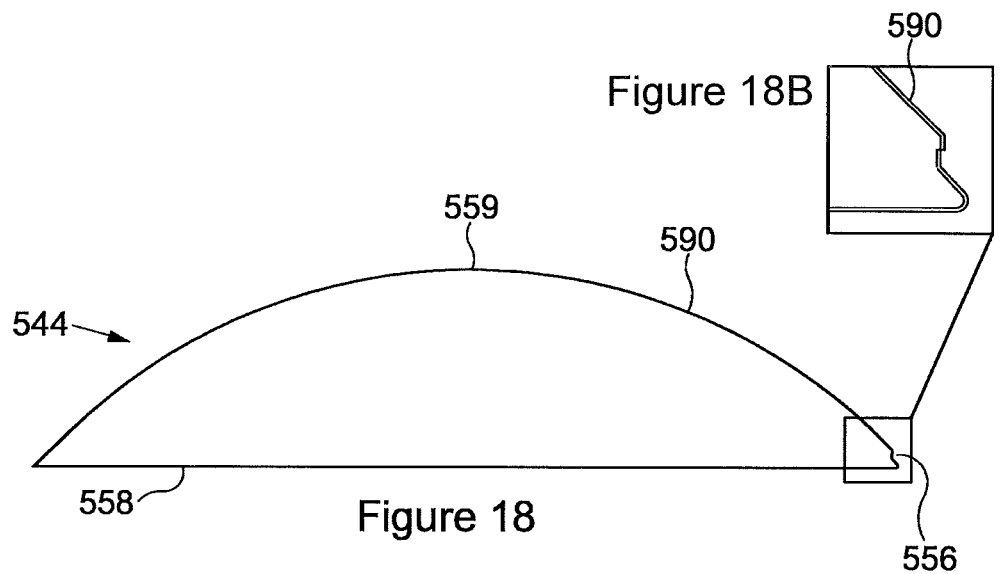
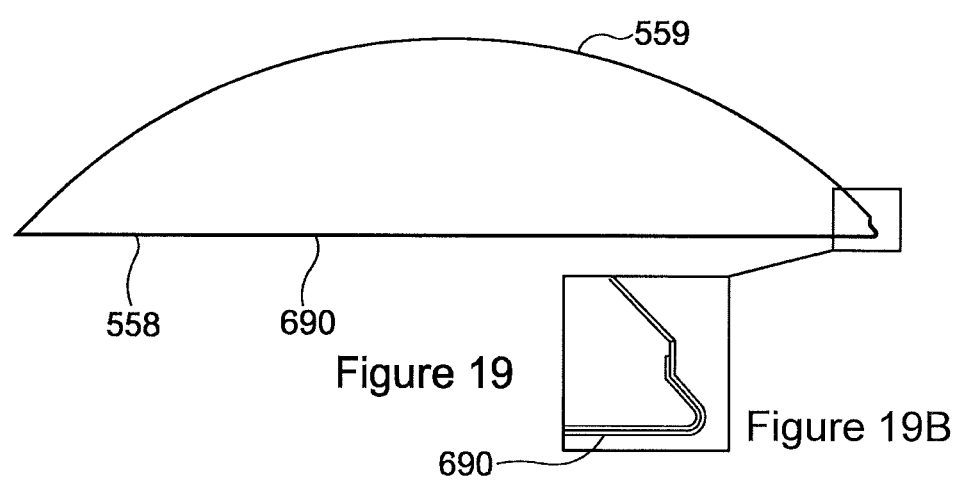

BALL VALVE

This application claims priority to PCT Patent Appln. No. PCT/GB2015/053855 filed Dec. 11, 2015, which claims priority to GB Patent Appln. No. 1500554.9 filed Jan. 14, 2015, which are herein incorporated by reference.

BACKGROUND OF THE INVENTION

1. Technical Field

The present invention relates to a ball valve configured for shearing a body upon closure. The present invention in particular, but not exclusively, relates to a ball valve for use in a landing string arrangement, for example for use within a subsea test tree.

2. Background Information

Landing strings are used in the oil and gas industry for through-riser deployment of equipment, such as completion architecture, well testing equipment, intervention tooling and the like into a subsea well from a surface vessel. When in a deployed configuration the landing string extends between the surface vessel and the wellhead, for example a wellhead Blow Out Preventor (BOP). While deployed the landing string provides many functions, including permitting the safe deployment of wireline or coiled tubing equipment through the landing string and into the well, providing the necessary primary well control barriers and permitting emergency disconnect while isolating both the well and landing string.

Wireline or coiled tubing deployment may be facilitated via a lubricator valve which is located proximate the surface vessel, for example below a rig floor.

Well control and isolation in the event of an emergency disconnect is provided by a suite of valves, typically ball valves, which are located at a lower end of the landing string, normally positioned inside the central bore of the BOP. The valve suite includes a lower valve assembly called the subsea test tree (SSTT) valve which provides a safety barrier to contain well pressure, and an upper valve assembly called the retainer valve which isolates the landing string contents and can be used to vent trapped pressure from between the retainer valve and SSTT valve. A shear sub component extends between the retainer valve and SSTT which is capable of being sheared by the BOP if required.

As noted above, the landing string may accommodate wireline and/or coiled tubing deployed tools. In this respect the various valve assemblies, such as in the SSTT, must define sufficiently large internal diameters to permit unrestricted passage of the tools therethrough. In addition, the valve assemblies also have outer diameter limitations, as they should be locatable within a wellhead BOP. Such strict design requirements may create difficulties. For example, achieving appropriate valve sealing may be difficult, because increasing the internal diameter within a restricted outer diameter may only permit a reduced sealing area to be provided.

Furthermore, the landing string must be capable of cutting any wireline or coiled tubing which extends therethrough in the event of an emergency disconnect. It is known in the art to use one or more of the valves to shear through the wireline or coiled tubing upon closure.

However, providing a valve with the necessary cutting capacity may be difficult to achieve within the geometric design constraints of a landing string. For example, valve actuators must be of sufficient size to provide the necessary closing/cutting forces, which may be difficult to accommodate within the restricted available size.

Furthermore, in ball valve applications a ball is provided with a through bore, wherein an edge of the through bore functions to cut through wireline or coiled tubing upon rotation of the ball towards a closed configuration. Known ball valves have circular through bores with generally pointed cutting edges, similar to a knife's cutting edge. Such ball valves tend to exhibit diminished sealing capability after one or more shearing operations. It is believed that this is at least partially because such pointed cutting edges tend to get slightly damaged after use. A damaged cutting edge may then interfere with the sealing functionality of the ball valve. For example, it has been observed that a slightly damaged cutting edge may scrape the seat and thus may compromise the sealing achieved between a sealing surface of the ball member and a seat of the ball valve. Thus, to ensure effective sealing after a shearing operation at least two conventional ball valves may have to be used, a first valve primarily designed to cut and a second valve designed to seal.

Another problem with existing ball valve designs is that when used to cut hollow conveyances such as coiled tubing, the cutting forces are applied initially centrally of the tubing, causing the tubing to collapse, making subsequent shearing of the collapsed tube difficult and energy/force intensive.

SUMMARY OF THE INVENTION

According to a first aspect of the present invention there is provided a ball valve comprising: a housing; a ball seat arranged in the housing; a ball member mounted within the housing and being rotatable relative to the ball seat between open and closed positions; the ball seat and ball member defining respective through bores; the ball member comprising a sealing surface, a bore surface and a leading edge surface extending between the sealing surface and the bore surface, the leading edge surface being configured to cut a body extending at least partially through the valve upon closure of the ball member; wherein the leading edge surface is truncated.

The respective through bores of the ball seat and ball member may define a flow path through the valve. The ball member may be rotated relative to the ball seat to misalign the respective through bores to prevent or restrict flow through the valve, and may be rotated relative to the ball seat to align, for example coaxially align, the respective through bores to permit or increase flow through the valve.

In use, closure of the ball member to prevent or restrict flow through the valve may also result in any body which at least partially extends through the valve being cut, for example partially or fully cut. This arrangement may permit full closure of the valve member to be achieved without being obstructed from the body.

The ball valve may have numerous applications as might readily be understood by those of skill in the art.

The ball valve may be used in an in riser system.

The ball valve may be used in an open water system.

In some embodiments the ball valve may be configured for use within a landing string assembly. For example, the ball valve may define or form part of a SSTT valve, a retainer valve, a lubricator valve or the like. According to a preferred embodiment of the present invention the ball valve may be a SSTT valve. The housing of the SSTT valve may be configured to be located within a blow out preventor (BOP). BOP's are well known in the industry.

It is believed that by employing a truncated leading edge surface it is less likely that any damage or deformation to the leading edge surface may damage the valve seat or the sealing surface of the ball member.

The truncated leading edge surface of the ball member may be configured to cut an elongate body including at least one of tubing, coiled tubing, wireline, slickline, a tool string or the like.

The truncated leading edge surface may comprise: a first edge defined at the interface of the truncated leading edge surface with the bore surface; a second edge defined at the interface of the truncated leading edge surface with the sealing surface; and an intermediate surface defined between the first and second edges.

The leading edge surface may be planar or substantially planar. Alternatively, the leading edge surface may be curved. Other geometries may also be employed without departing from the scope of the present invention.

The truncated leading edge surface may be perpendicular relative to the bore surface.

The truncated leading edge surface may be sloped at an angle relative to the bore surface.

The truncated leading edge surface may be sloped at an obtuse angle relative to the bore surface.

The truncated leading edge surface may be sloped at an acute angle relative to the bore surface.

The optimum angle for a particular application may depend on the relative dimensions of the ball member and the conveyance to be cut as well as the nature of the conveyance i.e. whether or not it is a hollow conveyance such as coiled tubing or a solid conveyance such as wireline.

The first edge may be a cutting edge.

The second edge may be a cutting edge.

According to one embodiment both the first and second edges are cutting edges.

It is believed that placing the truncated leading surface at an angle to the bore surface may allow initial engagement of the body to be cut at either the first or second cutting edge depending on the relative angle of the leading edge surface to the bore surface. This single point initial engagement may reduce the overall pressure exerted on the body to be cut which may prevent the collapsing observed with hollow conveyances such as coiled tubing.

According to one embodiment the angle is selected to allow initial engagement of the body to be cut at the first cutting edge.

Having a truncated leading edge surface at an angle to the bore surface may further be advantageous as it may provide additional void volume between the leading edge surface and a corresponding seat of the valve to allow any slight deformation of the leading edge surface to occur without adversely affecting the sealing capability of the ball member and/or the seat.

The intermediate surface between the first and second edges may also contribute to the shearing functionality of the leading edge surface. For example, upon initial engagement of the body to be cut by said first or second cutting edge the intermediate surface may also engage the body further enhancing the shearing of the body.

The intermediate surface may be flat or substantially flat. The intermediate surface may be curved.

The intermediate surface may comprise one or more serrations.

The leading edge surface may be an integral part of the ball member. For example, the leading edge surface may be machined to the desired truncated configuration.

The leading edge surface may be or comprise an insert or an add-on member. The insert or an add-on member may be securely attached to a truncated edge of the ball member, for example by welding or any other suitable techniques. Such insert or add-on member may define a cutting edge.

Such insert or add-on member may facilitate easier customization, maintenance and the like. For example, after use to re-establish a sufficient cutting edge only the insert need be replaced, rather than the entire ball. Also, the ball valve may be readily customized for the task at hand by mounting a suitable leading edge surface.

The leading edge surface may be made of the same material as the remaining of the ball member.

The leading edge surface may be made of a different material than the remaining of the ball member.

The ball valve member may comprise a relief region disposed proximate the truncated leading edge surface.

The relief region may be disposed immediate adjacent the truncated leading edge surface.

The relief region may be disposed above and/or below the truncated leading edge surface.

The relief region may be configured to accommodate slight damage or deformation to the truncated leading edge surface.

The relief region may prevent a deformed leading edge surface from scraping or scoring the seat of the ball valve.

The relief region may prolong the useful life of the ball valve by reducing sealing problems typically encountered after a shearing operation of the valve.

The seat of the ball valve may comprise a bore edge surface that is flat or substantially flat.

The seat may comprise a bore edge surface that is curved.

Employing a seat with a slightly curved bore edge surface may be advantageous for facilitating shearing.

The ball valve according to an embodiment of the invention may comprise a seat comprising a bore edge surface having a slightly raised end portion to allow a body to be cut to bend or deform over the raised portion during cutting. The raised portion may in essence operate as a fulcrum point to allow the body to be cut to bend or deform over the raised edge to thereby facilitate cutting. This may be particularly advantageous with hollow conveyances such as coiled tubing. It is observed that employing a seat with a raised end portion provides a fulcrum point for the body to be cut which facilitates shearing.

The seat may comprise a seal which upon closure of the ball member mates with a corresponding sealing area defined on the sealing surface of the ball member to seal the ball member through bore. The seal may be any well-known suitable seat seal. The seal may be an O-ring seal or the like. The seal may be a metal to metal seal.

The ball member may define a sealing area which may be part or the whole of the sealing surface which cooperates with an appropriate sealing area of the ball seat, at least when the valve is in a closed configuration. This sealing area may be specially treated to improve its sealing function.

The ball member may comprise one or more coatings.

The sealing area of the ball member may comprise a first coating to enhance sealing. The leading edge surface may comprise a second coating to enhance its shearing capability.

The first and second coatings may be the same or different coatings.

Any suitable coating or coatings may be used. A class of coatings that are particularly suitable are tungsten carbide coatings. Preferred coatings include tungsten carbide coatings marketed under the trade names PS-1005 and PS-1138 by Hardide Coatings.

According to one embodiment, a first coating may be applied to at least a part of the sealing surface and a second different coating is applied to at least a part of the leading edge surface. The first coating may be any suitable coating for enhancing the sealing capability of the treated sealing surface. The second coating may be any suitable coating for enhancing the hardness and shearing capability of the treated leading edge surface.

The coating or coatings may be applied by masking a section of the ball member that is not to be coated and then applying the coating to the remaining unmasked surfaces of the ball member.

The coating or coatings may be applied via high velocity oxy-fuel coating (HVOF) spraying. However other well-known techniques may also be used.

According to one embodiment a coating is applied to the leading edge surface using a gas plasma nitride (GPN) method.

Masking of the ball member may be achieved by using any suitable masking material and techniques. Upon completion of the application of the coating or coatings the mask is then removed.

The housing may be configured to be secured in-line with a fluid conduit system, wherein the ball seat and ball member may cooperate to control flow along the fluid conduit system. The fluid conduit system may be defined by one or more tubing components, flow equipment such as other valves, flow meters, shear-sub components or the like. The housing may be configured to be secured in-line with a landing string.

The housing may comprise first and second connectors for securing in-line with a fluid conduit system, such as a landing string. At least one of the first and second connectors may comprise a flange connector, such as a bolted flange connector. The first and second connectors may be configured to be secured to a similar component, such as tubing, for example. The first and second connectors may be configured to be secured to different components. For example, one connector may be configured to be secured to tubing, and one connector may be configured to be secured to flow equipment such as another valve or the like.

The housing may comprise a unitary component.

Alternatively, the housing may comprise two or more components.

The ball valve may comprise a plurality of respective ball seats and ball members. Such an arrangement may provide a degree of redundancy within the ball valve.

According to a second aspect of the present invention there is provided a ball valve comprising: a housing; a ball seat arranged in the housing; a ball member mounted within the housing and being rotatable relative to the ball seat between open and closed positions; the ball seat and ball member defining respective through bores; the ball member comprising a sealing surface, a bore surface, a leading edge surface extending between the sealing surface and the bore surface, the leading edge surface being configured to cut a body extending at least partially through the valve upon closure of the ball member; wherein the ball member comprises a relief region disposed proximate the leading edge surface.

The relief region may accommodate a damaged or deformed leading edge surface to prevent the damaged or deformed leading edge surface from negatively interfering with the sealing functionality of the ball valve. For example, the relief region may prevent a damaged or deformed leading edge surface from scraping the seat. The relief region may be disposed adjacent or immediate adjacent the truncated leading edge surface.

The relief region may be disposed above or below the truncated leading edge surface the terms below and above made to reference to the configuration of the ball valve when in use.

The leading edge surface may be pointed, rounded or truncated. According to one embodiment, the leading edge surface may be truncated or comprise a truncated portion. All the features described in connection with the first aspect of the invention may also be used with the second aspect of the invention.

According to a third aspect of the present invention there is provided a method for isolating a fluid conduit system having a body extending internally therethrough, the method comprising: securing a ball valve in-line within the fluid conduit system, wherein the ball valve comprises a housing, a ball seat arranged in the housing and a ball member mounted within the housing and being rotatable relative to the ball seat between open and closed positions, wherein the ball seat and ball member define respective through bores; the ball member comprising a sealing surface, a bore surface and a leading edge surface extending between the sealing surface and the bore surface, the leading edge surface being configured to cut a body extending at least partially through the valve upon closure of the ball member wherein said leading edge surface is truncated; and rotating the ball member to close the valve and to cut a body extending at least partially through the valve with the truncated leading edge surface.

Yet according to another aspect of the present invention there is provided a method for isolating a fluid conduit system having a body extending internally therethrough, the method comprising: securing a ball valve in-line within the fluid conduit system, wherein the ball valve comprises a housing, a ball seat arranged in the housing and a ball member mounted within the housing and being rotatable relative to the ball seat between open and closed positions, wherein the ball seat and ball member define respective through bores, the ball member comprising a sealing surface, a bore surface and a leading edge surface extending between the sealing surface and the bore surface, the leading edge surface being configured to cut a body extending at least partially through the valve upon closure of the ball member wherein the ball member comprises a relief region proximate the leading edge surface to accommodate damage to the leading edge surface to prevent the leading edge surface from scraping the seat; and rotating the ball member to close the valve and to cut a body extending at least partially through the valve with the leading edge surface.

According to yet another aspect of the present invention there is provided a landing string assembly comprising at least one ball valve having the features of the ball valve according to the first and/or second aspects of the present invention.

According to yet another aspect of the present invention there is provided a ball member having any of the features of the first and second aspects of the present invention and which is suitable for use with a ball valve.

According to an aspect of the present invention there is provided a ball member for a ball valve, the ball member comprising: a sealing surface, a bore surface and a leading edge surface extending between the sealing surface and the bore surface, the leading edge surface being configured to cut a body extending at least partially through the valve upon closure of the ball member; wherein the leading edge surface is truncated.

The truncated leading edge surface may have any of the features described above.

In yet another aspect of the invention there is provided a ball member for a ball valve the ball member comprising: the ball member comprising a sealing surface, a bore surface, a leading edge surface extending between the sealing surface and the bore surface, the leading edge surface being configured to cut a body extending at least partially through the valve upon closure of the ball member; wherein the ball member comprises a relief region disposed proximate the leading edge surface.

The leading edge surface and the relief region may have any of the features described in relation to any other aspect of the invention.

Features defined in relation to one aspect defined above may be associated with any other aspect.

BRIEF DESCRIPTION OF THE DRAWINGS

These and other aspects of the present invention will now be described, by way of example only, with reference to the accompanying drawings, in which:

FIG. 4 is a simplified cross sectional view of one half of a ball member with a truncated edge taken along axis A-A of FIG. 3.

FIG. 4A is an enlarged view of the boxed section of FIG. 4.

FIGS. 4B and 4C are enlarged views of the boxed section of FIG. 4 showing obtusely and acutely angled leading edge surfaces, respectively, according to different embodiments of the invention.

FIG. 5 shows an enlarged cross sectional view of a truncated leading edge surface of a ball member FIG. 6 shows the truncated leading edge surface of FIG. 5 in a position immediately after cutting a body in relation to a corresponding seat, according to an embodiment of the invention.

FIG. 7 shows the truncated leading edge surface of FIG. 6 in the fully closed position after having severed a section of tubing, according to one embodiment of the invention.

FIG. 12 shows a simplified cross sectional view of one half of a ball member with a truncated leading edge surface and a relief section, according to one embodiment of the invention.

FIG. 12A is an enlarged view of the boxed section of the ball member of FIG. 12.

FIGS. 12B and 12C are enlarged views of the boxed section of FIG. 12 showing obtusely and acutely angled leading edge surfaces, respectively, according to different embodiments of the invention.

FIG. 13 shows an enlarged cross sectional view of a truncated leading edge surface of a ball member also having a relief region, pressed against a body just prior to it being cut, according to one embodiment of the invention.

FIG. 14 shows the truncated leading edge surface of the ball member of FIG. 13 in a position immediately after cutting a body in relation to the seat, according to one FIG. 15 shows the truncated leading edge surface of the ball member of FIG. 14 in a fully closed position after having severed a body, according to one embodiment of the invention.

FIGS. 18 to 19B are simplified cross sectional views of one half of a ball valve member showing the application of a coating on the leading edge surface, sealing surface and bore surface according to one embodiment of the invention.

DETAILED DESCRIPTION OF THE INVENTION

Figure 1:
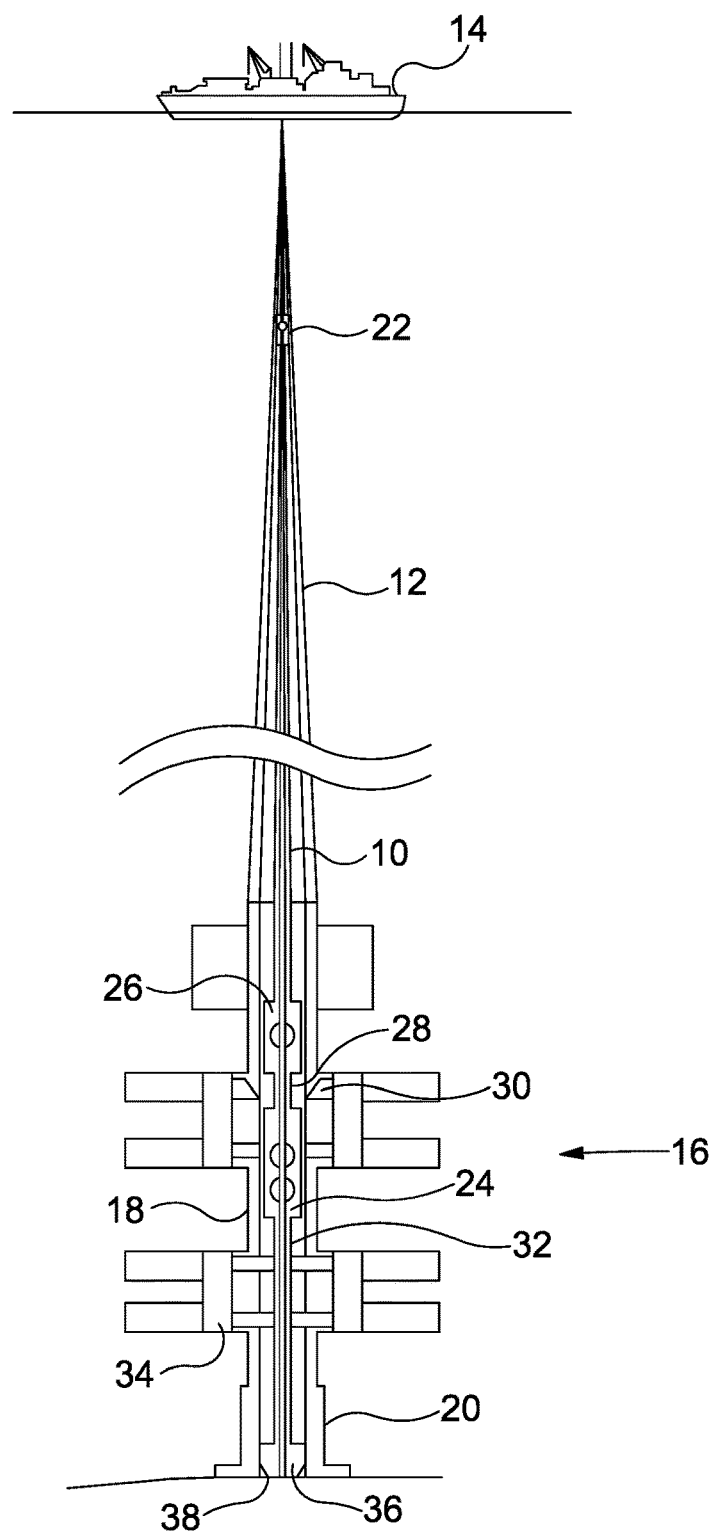
FIG. 1 is a simplified schematic illustration of a landing string according to one embodiment of the present invention.

A landing string assembly 10 is diagrammatically illustrated in FIG. 1, shown in use within a riser 12 and extending between a surface vessel 14 and a subsea wellhead assembly 16 which includes a BOP 18 mounted on a wellhead 20. The use and functionality of landing strings are well known in the art for through-riser deployment of equipment, such as completion architecture, well testing equipment, intervention tooling and the like into a subsea well from a surface vessel.

When in a deployed configuration the landing string 10 extends through the riser 12 and into the BOP 18. While deployed the landing string 10 provides many functions, including permitting the safe deployment of wireline or coiled tubing equipment (not shown) through the landing string and into the well, providing the necessary primary well control barriers and permitting emergency disconnect while isolating both the well and landing string 10.

Wireline or coiled tubing deployment may be facilitated via a lubricator valve 22 which is located proximate the surface vessel 14.

Well control and isolation in the event of an emergency disconnect is provided by a suite of valves, typically ball valves, which are located at a lower end of the landing string 10 inside the BOP. The valve suite includes a lower valve assembly called the subsea test tree valve (SSTT valve or SSTT) 24 which provides a safety barrier to contain well pressure, and also functions to cut any wireline or coiled tubing which extends through the landing string 10. The valve suite also includes an upper valve assembly called the retainer valve 26 which isolates the landing string contents and can be used to vent trapped pressure from between the retainer valve 26 and SSTT valve 24. A shear sub component 28 extends between the retainer valve 26 and SSTT valve 24 which is capable of being sheared by shear rams 30 of the BOP 18 if required. A slick joint 32 extends below the SSTT 24 which facilitates engagement with BOP pipe rams 34.

The landing string 10 may include an interface arrangement for interfacing with other oil filled equipment. For example, in the present embodiment the landing string 10 includes a tubing hanger 36 at its lowermost end which engages with a corresponding tubing hanger 38 provided in the wellhead 20. When the landing string 10 is fully deployed and the corresponding tubing hangers 36, 38 are engaged, the weight of the lower string (such as a completion, workover string or the like which extends into the well and thus not illustrated) becomes supported through the wellhead 20. However, during deployment of the lower string through the riser 12 all the weight and other forces associated with the lower string must be entirely supported through the landing string 10. Furthermore, when deployed a degree of tension is conventionally applied to the landing string 10, for example to prevent adverse compressive forces being applied, for example due to the weight of the landing string 10, which can be significant in deep water. The landing string 10 must thus be designed to accommodate significant in-service loadings, such as the global tension and bending loads from a supported lower string. Such in-service loadings, which may also include valve actuation loading, internal and external pressures and the like, must be accommodated across the various valve assemblies, such as the SSTT 24. It is therefore necessary to design the valve housings and appropriate end connections to be capable of accommodating the global applied tension, bending loads, valve actuation loading, pressures and the like.

Figure 2:
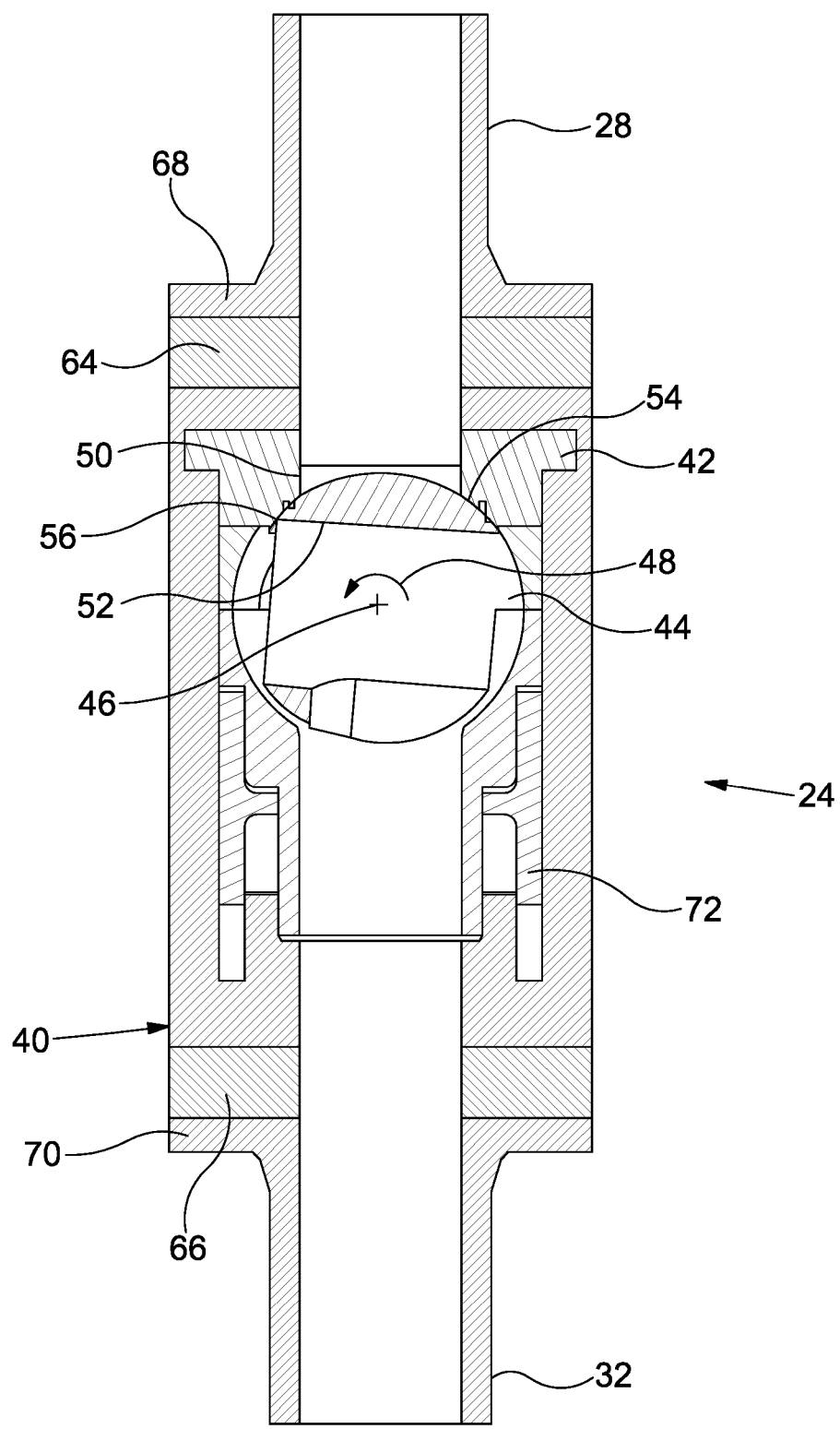
FIG. 2 is a simplified cross sectional view of a ball valve according to one embodiment of the invention.

A cross sectional view of a ball valve in accordance with an embodiment of the present invention is shown in FIG. 2. The ball valve may be provided for various functions, but for the purposes of the present description the ball valve may define a SSTT valve 24 of the landing string 10 shown in FIG. 1. It should be noted that although the SSTT valve 24 is illustrated in FIG. 1 as a dual ball valve, the arrangement shown in FIG. 2 is a single ball valve assembly for purposes of clarity.

Referring now to FIG. 2, the ball valve 24 includes a housing, generally identified by reference numeral 40 which is secured between the upper shear sub component 28 and the lower slick joint 32. As such, the ball valve 24 is installed in-line with the landing string 10 which can be considered to be a fluid conduit system. The housing 40 accommodates a ball seat 42 and a ball member 44, wherein the ball member 44 is rotatable about axis 46 to selectively close the ball valve 24 and control flow through the landing string 10. In the embodiment shown the ball member 44 is rotatable in the direction of arrow 48 to close the ball valve 24. The ball seat 42 and ball member 44 define respective through bores 50, 52 which when aligned define a flow path through the valve 24 and when misaligned (as shown in FIG. 2) prevent or restrict flow through the valve. When the ball member 44 is closed a sealing area 54 is defined between the ball seal 42 and ball member 44.

A leading edge surface 56 of the ball member 44 is configured to cut through a body (not shown), such as wireline, coiled tubing or the like which extends through the valve 24 and landing string 10 (FIG. 1) upon closure of the ball member 44.

A housing 40 is configured to be mechanically secured in-line with the landing string 10 (FIG. 1). The housing 40 comprises a generally cylindrical member which extends between axially opposing end flange connectors 64, 66 which are secured to flange components 68, 70 of the shear sub 28 and slick joint 32, respectively. The housing 40 is designed to accommodate mechanical forces, such as axial and bending forces, associated with the landing string 10 and those of any supported lower string.

The housing 40 also provides pressure containment of any and all internal and/or external pressures.

Various types of housings may be employed without departing from the scope of the present invention. For example, the housing may be a two part or split housing comprising an outer housing and an inner housing. In such an arrangement the outer housing may primarily be designed to connect the valve with the landing string and provide the required structural strength for the ball valve. The inner housing may be designed to provide pressure containment.

The housing 40 of the valve 24 includes opposing flange connectors 64, 66 which are secured to the respective flange components 68, 70 of the shear sub 28 and slick joint 32. Each flange connection 64, 68 and 66, 70 may be made via a plurality of bolts. One or more of the bolts may be pre-tensioned to provide a degree of preloading through the connections.

The ball valve further includes an actuator assembly, generally identified by reference numeral 72 for use in actuating the ball member 44 to rotate relative to the ball seat 42 between open and closed positions. In the present example, the actuator assembly 72 comprises a piston arrangement, however it should be understood that many other actuators may be used without departing from the scope of the present invention.

Figure 3:
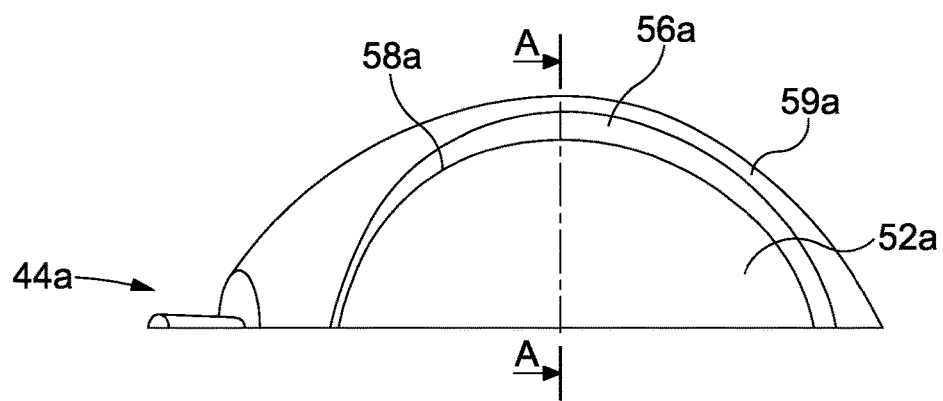
FIG. 3 is a simplified perspective view of an upper half section of a ball valve member according to one embodiment of the invention.

Reference is now made to FIGS. 3 to 4A which illustrate in simplified schematic form a first aspect of the present invention. FIG. 3 shows a perspective view of an upper half of a ball member identified generally by reference numeral 44a, according to an exemplary embodiment of the present invention. FIG. 4 shows a cross-sectional view of the ball member 44a of FIG. 3 taken along line A-A. FIGS. 3 to 4A have many features in common with features shown in FIG. 2 and as such like features share like reference numerals, suffixed with the letter "a".

Referring now to FIG. 3, the ball member 44a defines a through bore 52a. The ball member 44a further comprises a sealing surface 59a, a bore surface 58a, and a leading edge surface 56a extending between the sealing and bore surfaces.

The leading edge surface 56a is truncated, as can be seen in FIG. 4. As it can be better seen in FIG. 4A which is an enlarged view of the boxed section of FIG. 4, the truncated leading edge surface 56a comprises a first edge 51a defined at the interface of the truncated leading edge surface 56a with the bore surface 58a, and a second edge 53a defined at the interface of the truncated leading edge surface 56a with the sealing surface 59a. An intermediate surface 57a is defined between the first and second cutting edges 51a and 53a.

The leading edge surface 56a according to the embodiment shown in FIGS. 3 to 4A is flat or planar however, other configurations may also be used such as for example substantially flat or slightly curved.

The truncated leading edge surface 56a, as shown in FIGS. 4 and 4A, is perpendicular or substantially perpendicular to the bore surface. However, the truncated leading edge surface may be sloped relative to the bore surface 58a forming an obtuse or an acute angle a with the bore surface as diagrammatically illustrated in FIGS. 4B and 4C, respectively. FIGS. 4B and 4C share many features in common with FIG. 4A and for ease of reference similar features are denoted using similar numerals but with a suffix b or c, respectively in place of the suffix a.

The operation of a ball valve of the present invention will now be described in reference to FIGS. 5 to 7. FIGS. 5-7 employ ball member having a slightly sloped truncated leading edge surface 57b as shown in the enlarged view of FIG. 4B.

Referring now to FIGS. 5 to 7, the leading edge surface 56b is configured to engage with and cut to 7. The body 78b extends via through bore 52b of the ball member 44b and through bore 50b of the ball seat 42b.

In operation, rotation of the ball member 44b towards a closed position causes conveyance 78b to be engaged between an edge of the ball seat 45b and the first cutting edge 51b of the leading edge surface 56b of the ball member. Thus, according to the embodiment shown in FIGS. 5 to 7 the ball member 44b first engages the conveyance 78b at a first cutting edge 51b. The intermediate surface 57b is believed to provide space for the conveyance 78b to bend over the cutting edge 51b, thus facilitating the shearing action. Further rotation of the ball member 44b effects cutting of the coiled tubing 78b, primarily by a shearing action as shown in FIGS. 6 and 7.

Once the ball member is fully closed, a seal is formed between the sealing surface of the ball member and the bore edge surface of the seat facilitated further by a seal member 43b secured to the seat member 42b. Seal 43b may be any type of many well-known ball valve seat seal designs such as an O-ring seal or the like. It should be understood that other seal types may be used. According to one embodiment the sealing between the seat and the sealing surface of the ball member may be a metal to metal seal.

The seat 42b of the ball valve may comprise a bore edge surface 47b that is flat (not shown) or it may include a slightly raised end portion 49b as shown in FIGS. 6 and 7 to further allow the conveyance 78b to bend during cutting.

Figure 8:
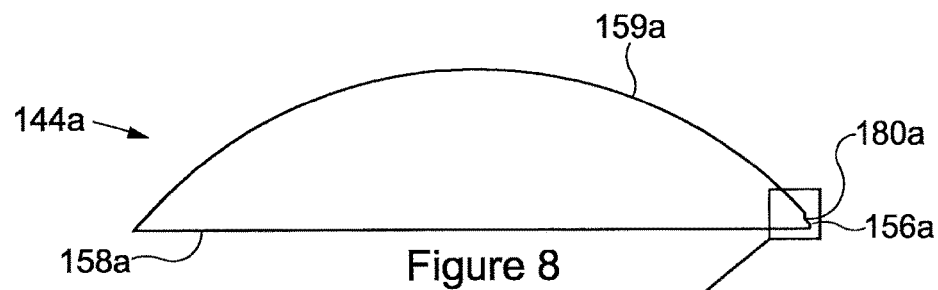
FIG. 8 is a simplified cross sectional view of one half of a ball member with a relief section, according to one embodiment of the invention.
Figure 8A:
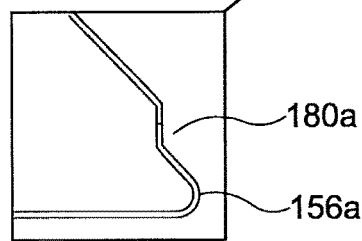
FIG. 8A is an enlarged view of the boxed section of FIG. 8.

Referring now to FIGS. 8 and 8A another aspect of the present invention is illustrated. The ball member of FIGS. 8 and 8A has many features in common with the ball member shown in FIGS. 4 and 4A and as such like features share like reference numerals, augmented by 100.

The ball valve according to another aspect of the present invention comprises a ball member 144a as shown in FIGS. 8 and 8A. The ball member 144a comprises a sealing surface 159a, a bore surface 158a and a leading edge surface 156a extending between the sealing surface 159a and the bore surface 158a. The ball member 144a further comprises a relief region 180a disposed immediately above the leading edge surface 156a. The relief region 180a is configured to accommodate a damaged or distorted leading edge surface 156a so that it may prevent it from scraping or damaging the seat.

It has been observed that after operation of a ball valve to cut a conveyance the sealing capability of the ball valve may be thereafter compromised. The applicant has sealing operation of the ball valve may, following a cutting operation, improve substantially. The leading edge surface 156a in the embodiment shown in 8 is not truncated, but it has a smoothly curved pointed shape. This can better be seen in FIG. 8 which provides an enlarged view of the boxed section of FIG. 8.

Figure 9:
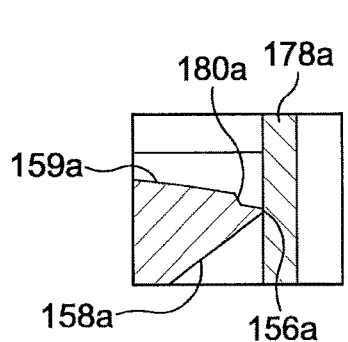
FIG. 9 shows an enlarged cross sectional view of a ball member with a relief region showing a leading edge surface of the ball member pressed against a body just prior to being cut, according to an embodiment of the invention.
Figure 10:
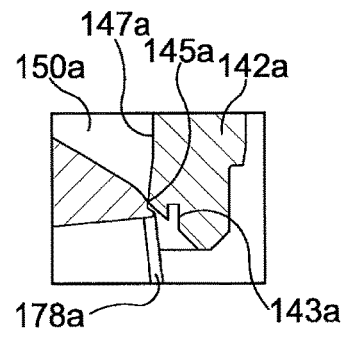
FIG. 10 shows the leading edge surface of FIG. 9 in a position immediately after cutting a body in relation to a corresponding seat, according to one embodiment of the invention.
Figure 11:
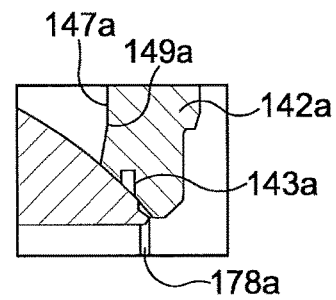
FIG. 11 shows the leading edge surface of FIG. 10 in a fully closed position after having severed a body, according to one embodiment of the invention.

The operation of a ball valve having a ball member with a relief region and a smoothly curved pointed shape leading edge surface is shown diagrammatically in FIGS. 9 to 11.

Referring now to FIGS. 9 to 11, the leading edge surface 156a is configured to engage with and cut through a body 178a, such as coiled tubing. The body 178a extends via through bore 152a of the ball member 144a and through bore 150a of the ball seat 142a.

In operation, rotation of the ball member 144a towards a closed position causes conveyance 178a to be engaged between an edge of the ball seat 145a and the leading edge surface 156a of the ball member 144a. Thus, according to the embodiment shown in FIGS. 9 to 11 the ball member 144a first engages the conveyance 178a at the leading edge surface 156a. Further rotation of the ball member 144a effects cutting of the coiled tubing 178a, primarily by a shearing action as shown in FIGS. 10 and 11.

Once the ball member is fully closed, a seal is formed between the sealing surface of the ball member and the bore edge surface of the seat facilitated further by a seal member 143a secured to the seat member 142a. Seal 143a may be any type of many well-known ball valve seat seal designs such as an O-ring seal or the like. It should be understood that other seal types may be used. According to one embodiment the sealing between the seat and the sealing surface of the ball member may be a metal to metal seal.

The seat 142a of the ball valve may comprise a bore edge surface 147a that is flat (not shown) or it may include a slightly raised end portion 149a as shown in FIGS. 10 and 11 to allow the conveyance 178a to bend during cutting.

It is believed that relief region 180a may accommodate any slight damage to the leading edge surface 156a thus preventing interference with the sealing functionality of the valve. The relied region 180a should be positioned in an area of the ball member that is proximate to the leading edge surface 156a but without interfering with the sealing upon full closure of the ball member.

In the embodiment of FIG. 8 a relief region is provided in conjunction with a non-truncated leading edge surface. However, it in yet another embodiment if the present invention as illustrated in FIG. 12 a ball valve is provided having a ball member 244a having both a relief region 280a and a truncated leading edge surface 256a.

The ball valve of FIGS. 12 and 12A has many features in common with the ball valve shown in FIGS. 4 and 4A and as such like features augmented with 200.

Referring now to FIG. 12, a relief region 280 is disposed immediately adjacent a truncated leading edge surface 256a. Leading edge surface 256a is perpendicular to the bore surface 258a, however, as discussed earlier, the leading edge surface may be sloped at an angle a relative to the bore. The angle a may be an obtuse or acute angle as shown in FIGS. 12B and 12C respectively. FIGS. 12B and 12C share many features in common with FIG. 12A and thus we use the same numerals to denote similar features but with suffix B or C, respectively, in place of the suffix a used in respect with FIG. 12A.

Referring now to FIG. 12 the ball valve according to another aspect of the present invention comprises a ball member 244a. The ball member 244a comprises a sealing surface 259a, a bore surface 258a and a leading edge surface 256a extending between the sealing surface 259a and the bore surface 258a. The ball member 244a further comprises a relief region 280a disposed immediately above the leading edge surface 256a. The relief region 280a is configured to accommodate a damaged or distorted leading edge surface 256a so that it may prevent it from scraping or damaging the seat.

The leading edge surface 256a in the embodiment shown in 12 is also truncated. This relief region and the truncated leading edge surface may be better seen in FIG. 12A which provides an enlarged view of the boxed section of FIG. 12.

Referring now to FIG. 12A, the truncated leading edge surface 256a comprises a first edge 251a defined at the interface of the truncated leading edge surface 256a with the bore surface 258a, and a second edge 253a defined at the interface of the truncated leading edge surface 256a with the sealing surface 259a. An intermediate surface 257a is defined between the first and second cutting edges 251a and 253a. A relief region 280a forms a generally oval shape recess on the sealing surface of the ball member at a position immediately adjacent the edge 253a of the leading edge surface 256a.

The leading edge surface 256a according to the embodiment shown in FIGS. 12 and 12A is flat or planar however, other configurations may also be used such as for example substantially flat or slightly curved.

The truncated leading edge surface 256a, as shown in FIGS. 12 and 12A, is perpendicular or substantially perpendicular to the bore surface 258a. However, the truncated leading edge surface may be sloped relative to the bore surface 258a forming an obtuse or an acute angle a with the bore surface as diagrammatically illustrated in FIGS. 12B and 12C, respectively. FIGS. 12B and 12C share many features in common with FIG. 12A and for ease of reference similar features are denoted using similar numerals but with a suffix B or C, respectively in place of the suffix A.

The operation of a ball valve having a ball member 244c with a relief region 280c and a truncated leading edge surface 256a as shown in FIG. 12C is illustrated in in FIGS. 13 to 15.

In operation, rotation of the ball member 244c towards a closed position causes conveyance 278c to be engaged between an edge of the ball seat 245c and the first cutting edge 251c of the leading edge surface 256c of the ball member. Thus, according to the embodiment shown in FIGS. 13 to 15 the ball member 244c first engages the conveyance 278c at a cutting edge 253c. The intermediate surface 257c is believed to provide space for the conveyance 278c to bend over the cutting edge 253c, thus facilitating the shearing action. Further rotation of the ball member 244c effects cutting of the coiled tubing 278c, primarily by a shearing action as shown in FIGS. 14 and 15.

Once the ball member is fully closed, a seal is formed between the sealing surface of the ball member and the bore edge surface of the seat facilitated further by a seal member 243c secured to the seat member 242c. Seal 243c may be any type of many well-known ball valve seat seal designs such as an O-ring seal or the like. It should be understood that other seal types may be used. According to one embodiment the sealing between the seat and the sealing surface of the ball member may be a metal to metal seal. Importantly relief region 280c may be disposed so that upon closure of the ball member will not interfere with the sealing area between the sealing surface of the ball member and the seat seal 243c. In the embodiment shown in FIGS. 13-15 upon full closure of the ball member 244c the relief region 280c is positioned below the seal 243c.

The seat 242c of the ball valve may comprise a bore edge surface 247c that is flat (not shown) or it may include a slightly raised end portion 249c as shown in FIGS. 14 and 15 to further allow the conveyance 278c to bend during cutting.

Figure 16A:
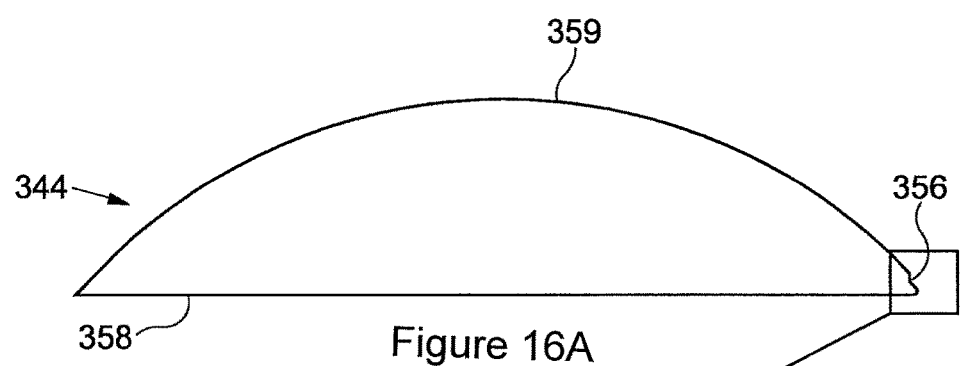
FIGS. 16A and 16B are simplified cross sectional views of one half of a ball valve member showing the application of a coating on the sealing surface, according to one embodiment of the invention.
Figure 16B:
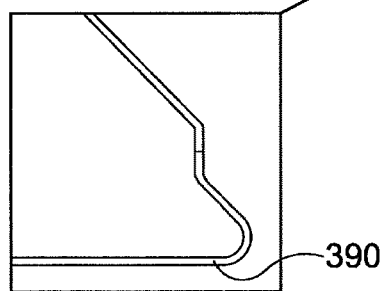

Referring to FIGS. 16A and 16B, a method for applying a coating to the sealing surface 359 of the ball valve member 344 is described. The method comprises masking the leading edge surface 356 and bore surface 358 with a suitable masking material 390 and applying a coating using a high velocity oxy-fuel (HVOF) method to the sealing surface 359. The mask is then removed from the bore surface 58 and the leading edge surface 56.

Figure 17A:
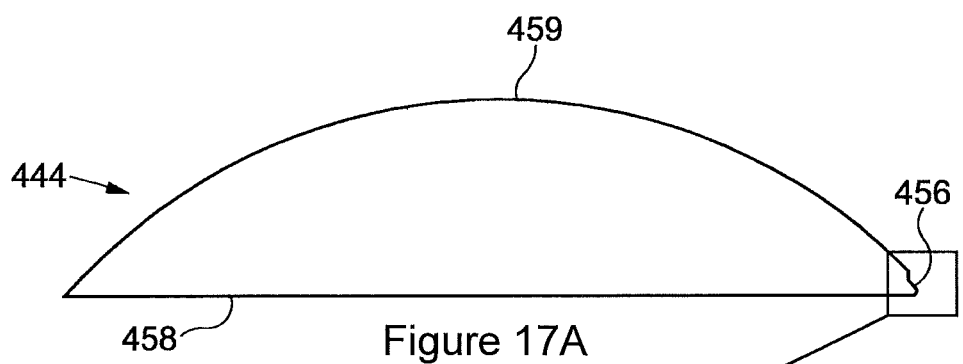
FIGS. 17A and 17B are simplified cross sectional views of one half of a ball valve member showing the application of a coating on the sealing surface and leading edge surface, according to one embodiment of the invention.
Figure 17B:
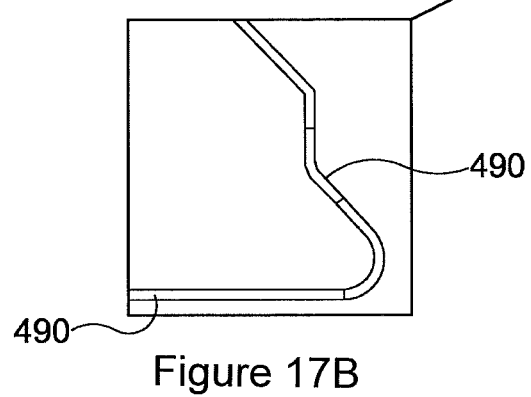

Referring now to FIGS. 17A and 17B, another embodiment of the method of applying a coating is depicted. The method applies a coating to the sealing surface 459, as well as the leading edge surface 459, but excluding the relief region 480. This method comprises masking the relief region 480 as well as the bore surface 458 with a suitable masking material 490. A coating is then applied using HVOF to the sealing surface 459 and the leading edge surface 456. The mask is then removed from the bore surface 458 and the relief region 480.

Yet another embodiment of the method of applying a coating is illustrated in FIGS. 18 to 19. This method comprises masking the sealing surface 559 with a suitable masking material 590. Care should be applied to ensure the leading edge surface 556 remains unmasked. In this version, a coating, using a gas plasma nitride (GPN) method, is then applied to the leading edge surface 556 and the bore surface 58. The mask is then removed from the sealing surface 59, and a masking material 690 is applied to the leading edge surface 556 and the bore surface 558, to completely cover them. Then a coating using HVOF is applied on the unmasked sealing surface 559. Following the application of the coating to the sealing surface 559, the mask is removed and the ball valve member 544 is ready for use.

For example the sealing area of the ball member may comprise a first coating designed primarily to enhance the sealing functionality of the sealing surface, whereas the leading edge surface may comprise a second coating designed primarily to enhance its shearing capability.

Any suitable coating or coatings may be used. A class of coatings that are particularly suitable are tungsten carbide coatings. Preferred coatings include tungsten carbide coatings marketed under the trade names PS-1005 and PS-1138 by Hardide Coatings.

Coatings may be applied to the leading edge surface 556, sealing surface 559 or bore surface 558 for reasons other than to improve their working properties; for example, increase their resistance to corrosion or erosion.

In the embodiments described above, the housing defines a generally cylindrical outer profile. However, in other embodiments a non-cylindrical outer profile may be provided. For example an oval outer profile may be provided as may be needed for permitting other components such as a umbilical to be accommodated between the valve and an outer constraining component, such as a riser.

It should be understood that the embodiments described herein are merely exemplary and that various modifications may be made thereto without departing form the scope of the present invention. For example, the disclosed valve embodiments are not solely for use within a landing string, and may be used in many other applications as would be understood by a person of skill in the art. Furthermore, the truncated leading edge surface ball valve also be used in combination with different valve types, and is not limited solely for use in ball valve applications, although defined and specific advantages do exist in such ball valve applications.

What is claimed is:

1. A ball valve comprising:
   a housing;
   a ball seat arranged in the housing;
   a ball member mounted within the housing and being rotatable relative to the ball seat between open and closed positions;

the ball seat and the ball member defining respective through bores;

the ball member comprising a sealing surface, a bore surface, a leading edge surface extending between the sealing surface and the bore surface defined by the respective through bore, the leading edge surface being configured to cut a body extending at least partially through the valve upon closure of the ball member;

wherein the ball member comprises a relief region disposed proximate the leading edge surface such that the relief region is positioned between the leading edge surface and the sealing surface; and the relief region defines a transition surface between the leading edge surface and the sealing surface.

2. The ball valve according to claim 1, wherein the respective through bores of the ball seat and the ball member define a flow path through the valve, wherein the ball member is rotated relative to the ball seat to misalign the respective through bores to prevent or restrict flow through the valve, and is rotated relative to the ball seat to align the respective through bores to permit or increase flow through the valve.

3. The ball valve according to claim 1, defining or forming part of at least one of a Subsea Test Tree (SSTT), a retainer valve and a lubricator valve.

4. The ball valve according to claim 1, wherein the leading edge surface is configured to cut an elongate body including at least one of tubing, coiled tubing, wireline, slickline and a tool string.

5. The ball valve according claim 1, wherein the leading edge surface is truncated.

6. The ball valve according to claim 5, wherein the truncated leading edge surface is planar, substantially planar or slightly curved.

7. The ball valve according to claim 5, wherein the truncated leading edge surface is perpendicular relative to the bore surface.

8. The ball valve according to claim 5, wherein the truncated leading edge surface is sloped at an angle relative to the bore surface.

9. The ball valve according to claim 5, wherein the truncated leading edge surface is sloped at an obtuse angle relative to the bore surface.

10. The ball valve according to claim 5, wherein the truncated leading edge surface is sloped at an acute angle relative to the bore surface.

11. The ball valve according to claim 1, wherein the leading edge surface is an insert or an add-on member securely attached to the ball member.

12. The ball valve according to claim 1, wherein the seat comprises a bore edge having a raised portion to allow coiled tubing to bend during cutting.

13. A ball member for a ball valve, the ball member being rotatable within the ball valve between open and closed positions, the ball member comprising:

a sealing surface, a bore surface defined by a through bore, a leading edge surface extending between the sealing surface and the bore surface, the leading edge surface being configured to cut a body extending at least partially through the valve upon closure of the ball member;

wherein the ball member comprises a relief region disposed proximate the leading edge surface such that the relief region is positioned between the leading edge surface and the sealing surface; and the relief region defines a transition surface between the leading edge surface and the sealing surface.

14. The ball valve according to claim 1, wherein the relief region is a single relief region.

15. The ball valve according to claim 1, wherein the leading edge surface is an integral part of the ball member.

* * * * *